United States Patent [19]

Wu et al.

[11] 4,027,332
[45] May 31, 1977

[54] APPARATUS FOR MONITORING TELEVISION RECEIVERS

[75] Inventors: Joseph C. Wu, Saratoga; Clyde R. Walsworth, Sunnyvale; Calvin W. Eckels, Jr., San Jose, all of Calif.

[73] Assignee: Time and Frequency Technology Inc., Santa Clara, Calif.

[22] Filed: Nov. 21, 1975

[21] Appl. No.: 634,248

[52] U.S. Cl. .............................................. 358/139
[51] Int. Cl.² ........................................ H04N 7/02
[58] Field of Search ................... 178/5.8 R, 5.8 A; 325/31, 311; 358/139

[56] References Cited

UNITED STATES PATENTS

| | | | |
|---|---|---|---|
| 2,958,766 | 11/1960 | Evans | 325/31 |
| 3,663,747 | 5/1972 | Janssen | 178/5.8 R |
| 3,737,565 | 6/1973 | Ma et al. | 178/5.8 R |
| 3,803,349 | 4/1974 | Watanabe | 178/5.8 R |

Primary Examiner—Richard Murray
Assistant Examiner—Mitchell Saffian
Attorney, Agent, or Firm—Jack M. Wiseman

[57] ABSTRACT

Apparatus for monitoring the use of television receivers to obtain information for the rating of television programs. The apparatus makes a comparison between the intercarrier frequency signal (i.e., phase) produced by extracting from an operating television receiver tuned to a channel the visual and aural IF frequencies and the respective intercarrier frequency signals (i.e., phase) produced by successively extracting from transmitting sources of television channels the visual and aural IF frequencies. The intermediate frequency signals of the television receiver are sampled and converted into an intercarrier frequency signal. A voltage controlled tuner is tuned to the radio frequency carriers of the various television channels in a hunting sequence. The output signals of the voltage controlled tuner are intermediate frequency signals, which are converted into intercarrier signals. When the intercarrier frequency emanating from the voltage controlled tuner is phase coherent with the intercarrier frequency signal emanating from the operating television receiver over a prescribed period of time, such as 10 seconds, then an identification is made of the channel to which the operating television receiver is tuned and this information is recorded.

20 Claims, 4 Drawing Figures

Fig-4

|  | TONE | | | | | | |
|---|---|---|---|---|---|---|---|
|  | 1 | 2 | 3 | 4 | 5 | 6 | 7 |
| 0  | 1 | 1 | 1 | 0 | 0 | 0 | 0 |
| 1  | 1 | 1 | 0 | 1 | 0 | 0 | 0 |
| 2  | 1 | 1 | 0 | 0 | 1 | 0 | 0 |
| 3  | 1 | 1 | 0 | 0 | 0 | 1 | 0 |
| 4  | 1 | 1 | 0 | 0 | 0 | 0 | 1 |
| 5  | 1 | 0 | 1 | 1 | 0 | 0 | 0 |
| 6  | 1 | 0 | 1 | 0 | 1 | 0 | 0 |
| 7  | 1 | 0 | 1 | 0 | 0 | 1 | 0 |
| 8  | 1 | 0 | 1 | 0 | 0 | 0 | 1 |
| 9  | 1 | 0 | 0 | 1 | 1 | 0 | 0 |
| 10 | 1 | 0 | 0 | 1 | 0 | 1 | 0 |
| 11 | 1 | 0 | 0 | 1 | 0 | 0 | 1 |
| 12 | 1 | 0 | 0 | 0 | 1 | 1 | 0 |
| 13 | 1 | 0 | 0 | 0 | 1 | 0 | 1 |
| 14 | 1 | 0 | 0 | 0 | 0 | 1 | 1 |
| 15 | 0 | 1 | 1 | 1 | 0 | 0 | 0 |
| 16 | 0 | 1 | 1 | 0 | 1 | 0 | 0 |
| 17 | 0 | 1 | 1 | 0 | 0 | 1 | 0 |
| 18 | 0 | 1 | 1 | 0 | 0 | 0 | 1 |
| 19 | 0 | 1 | 0 | 1 | 1 | 0 | 0 |
| 20 | 0 | 1 | 0 | 1 | 0 | 1 | 0 |
| 21 | 0 | 1 | 0 | 1 | 0 | 0 | 1 |
| 22 | 0 | 1 | 0 | 0 | 1 | 1 | 0 |
| 23 | 0 | 1 | 0 | 0 | 1 | 0 | 1 |
| 24 | 0 | 1 | 0 | 0 | 0 | 1 | 1 |
| 25 | 0 | 0 | 1 | 1 | 1 | 0 | 0 |
| 26 | 0 | 0 | 1 | 1 | 0 | 1 | 0 |
| 27 | 0 | 0 | 1 | 1 | 0 | 0 | 1 |
| 28 | 0 | 0 | 1 | 0 | 1 | 1 | 0 |
| 29 | 0 | 0 | 1 | 0 | 1 | 0 | 1 |
| 30 | 0 | 0 | 1 | 0 | 0 | 1 | 1 |
| 31 | 0 | 0 | 0 | 1 | 1 | 1 | 0 |

APPARATUS FOR MONITORING TELEVISION RECEIVERS

BACKGROUND OF THE INVENTION

The present invention relates in general to apparatus for monitoring television receivers to obtain information for the rating of television programs.

Heretofore, monitoring apparatus had detected the local oscillator frequency generated within the monitored television receiver. While the detection of the local oscillator frequency of the television receiver offered a positive identification of the channel to which a monitored television receiver was tuned, the measurement of the local oscillator frequency generally was not reliable or accurate. Examples of monitoring systems for television receivers employing the detection of local oscillators in the television receiver being monitored are disclosed in the following U.S. Pat. Nos. 2,965,433; 3,456,192; 3,506,916; 3,299,355.

It has been heretofore known to have a monitoring apparatus for monitoring a television receiver in which a comparison was made between the vertical and/or horizontal synchronization signals from the monitored television receiver and the corresponding signal demodulated from a known television channel. The latter signal was obtained from a television tuner in the monitoring apparatus. It has been found that several transmitters broadcasting the same television program over different channels would transmit essentially the same synchronization pulses. As a consequence thereof, it was difficult to distinguish between the two channels in recording the monitoring information. If an attempt were made to detect very small phase differences in the synchronization pulses, then false indications resulted.

An example of a monitoring apparatus for television receivers employing vertical and/or horizontal synchronization signals is disclosed in the following U.S. Pat. No. 3,372,233.

Another system previously known employed the measurement of the input impedance of the tuner of the television receiver. The input impedance of the tuner of the television receiver offered a positive identification of the channel selected. In this system, an R.F. signal was injected into the input of the tuner of the television receiver. The injected R.F. signal was, in effect, superimposed on the television signal detected by the antenna. As a consequence thereof, the quality of the picture of the television picture tube had been affected.

A commonly known monitoring technique, which is disclosed in the patent to Krahulec, U.S. Pat. No. 2,838,359, was the detection of the position of the tuning shaft of the tuner of the television receiver. This arrangement was derived from the fact that the frequency of the local oscillator was an indication of the channel selected by the monitored television receiver.

Various modulating techniques for monitoring a television receiver have been disclosed in the following U.S. Pat. Nos. 2,892,885; 3,312,900; 2,935,557; 3,397,402; 2,864,941; 3,703,684.

Disclosed in the patent to Watanabe, U.S. Pat. No. 3,803,349, issued on Apr. 9, 1974, is a monitor for television receivers in which a comparison is made between a sound intermediate frequency signal from a monitored television receiver and sound intermediate frequency signals successively received by a monitoring apparatus having a tuner that is successively tuned to the various channels. The tuner of the monitoring apparatus scans the channels of television programs until it detects the same channel to which the monitored television receiver is tuned. It appears, however, that the sound intermediate frequency signal is not readily extractable from a television receiver and that it is difficult to physically locate the sound IF frequency for extracting the same.

In the patent to Clark, Jr., U.S. Pat. No. 2,483,573, a comparison is made between the local oscillator of a radio receiver and an oscillator sweeping through the radio frequency range of the receiver for detecting the station to which the receiver is tuned. The position of a tuning capacitor that varies the frequency of the sweeping oscillator identifies the station to which the radio receiver is tuned.

The patent to Joseph Wu, U.S. Pat. No. 3,736,510, issued on May 29, 1973, for a Frequency And Modulation Monitor, disclosed apparatus for detecting intercarrier spacing errors in which a period comparator circuit compares the period between the incoming signal from the reference divider and the incoming signal from the variable program divider to detect a difference in periods for determining the intercarrier spacing error.

Other patents of interest are as follows: U.S. Pat. Nos. 2,958,766; 3,058,065; 3,143,705; 3,760,275; 3,849,729; 3,034,707; 2,917,622; 3,483,327; 3,318,517; 3,126,513.

SUMMARY OF THE INVENTION

Apparatus for monitoring a television receiver in which a phase comparison is made between the intercarrier signal produced by extracting from a television receiver visual and aural IF frequency signals and the respective intercarrier signals produced by extracting successively from transmitting sources of television broadcast channels visual and aural IF frequency signals, which visual and aural IF frequency signals are detected by a channel scanning tuner within the monitoring apparatus.

The intermediate frequency signal of a television receiver is relatively accessible and relatively easy to locate for the placement of the sampling probe.

A feature of the present invention is the phase coherent matching by a phase detector of the compared intercarrier signals, which improves the reliability of the television monitor.

Another feature of the present invention is that the comparison of the intercarrier signals must indicate similarity of channel over a predetermined period of time in order to establish the identity of the channel, which improves the accuracy of the television monitor.

By virtue of the present invention, a highly accurate and reliable apparatus for monitoring television receivers is achieved, which is relatively inexpensive to manufacture.

The concepts employed in the apparatus of the present invention will provide an apparatus for monitoring television receivers that is essentially free of false indications and, of course, subject to less errors.

The signals representing the monitor data are transmitted over the household power lines to be recorded as digital data. Thus, local data storage is provided for improved portability. Further, the monitor data is transmitted over the power line as a tone modulated signal for improved reception to overcome an adverse noise environment.

Another feature of the present invention is that the monitor is as portable as the television receiver being monitored and the elimination of the installation of coaxial cable between the monitor and the data receiver. Additionally, the tuner is capable of being located in the immediate vicinity of the television receiver pickup device.

DESCRIPTION OF THE DRAWINGS

FIG. 4 is a table illustrating the various tones produced by the tone generating matrix for identifying the monitoring status.

DETAILED DESCRIPTION OF THE PREFERRED EMBODIMENT

A television broadcast signal comprises two R.F. carriers, namely: a visual carrier and an aural carrier. The difference between the visual carrier frequency and the aural carrier frequency is the intercarrier frequency. By FCC regulation, the visual carrier and the aural carrier are spaced approximately 4.5 $MH_z$ apart and should be maintained with $\pm 1$ $KH_z$ of this value. In actual practice, the intercarrier frequency of a particular channel is maintained within 35 500 $H_z$ of 4.5 $MH_z$ and generally varies over short time periods by $\pm 10$ $H_z$ to $\pm 200$ $H_z$. The reason for the intercarrier frequency for one channel varying substantially from the intercarrier frequency of another channel is that in all television transmitters the visual carrier frequency and the aural carrier frequency are controlled by different time bases. In practice, the intercarrier frequency will vary from channel to channel because the frequency control in the transmitter of either the visual frequency carrier or the aural frequency carrier or both is not perfect. It would be unlikely that the instantaneous intercarrier frequency (i.e., phase) of two channels will be identical. The intercarrier frequency of the tuner is independent of the fine tuning of the television receiver.

The probability of two channels having identical intercarrier frequencies is remote for additional reasons. Since the aural carrier is frequency modulated, the intercarrier frequency is constantly varying as the aural program content changes. These changes in frequency can be as great as $\pm 25$ $KH_z$ at the rate of up to 15 $KH_z$ in normal television programming. If, over a given period of time, such as ten seconds, the intercarrier signal produced by extracting the visual and aural IF frequencies from a monitored television receiver tuned to a channel is phase coherent with the intercarrier frequency signal produced by extracting visual and aural IF frequencies from one of a plurality of television transmitting sources for the respective channels to which a tuner is tuned, then a positive identification is made of the channel to which the television receiver is tuned.

Figure 1:
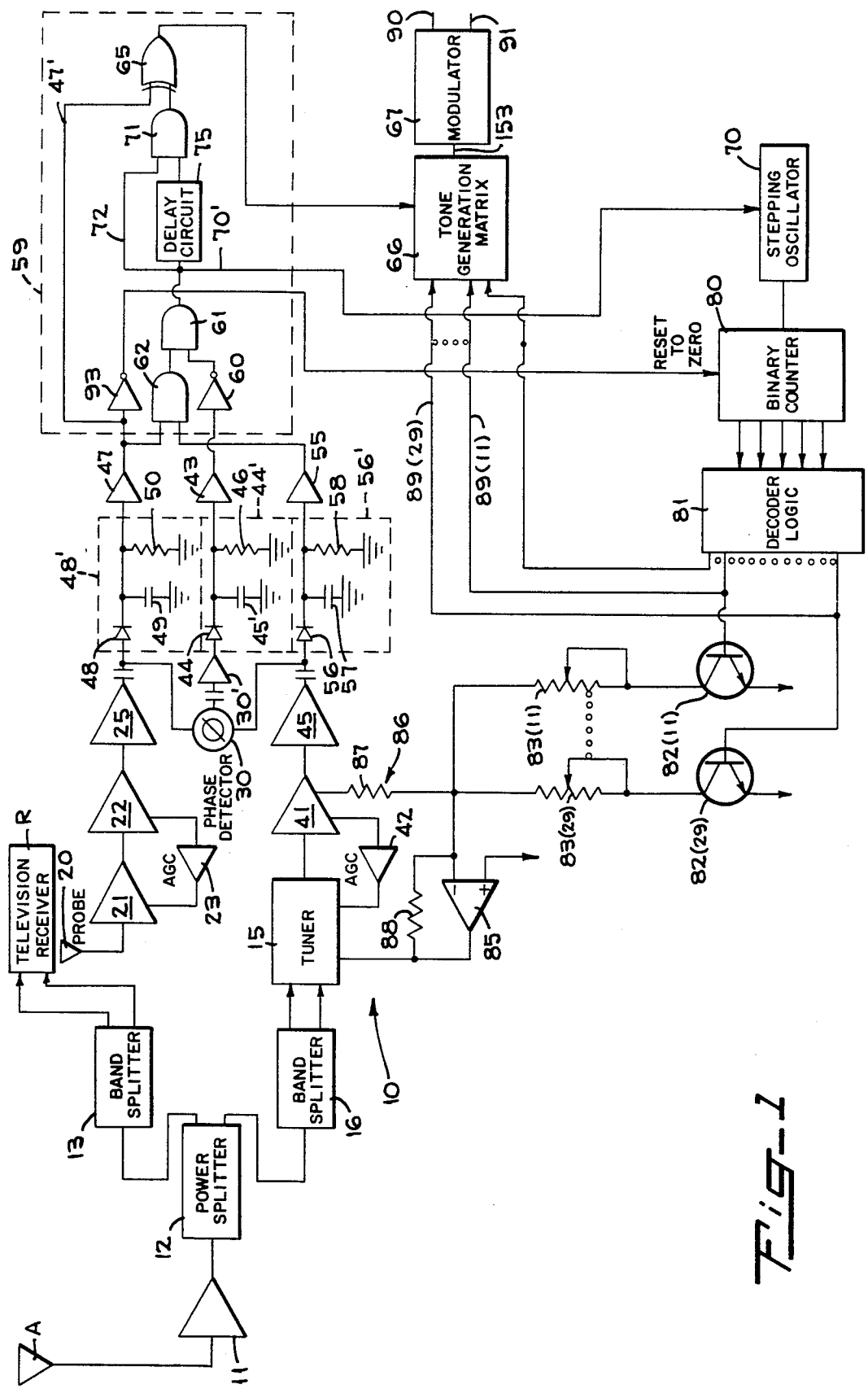
FIG. 1 is a block diagram of an apparatus for monitoring television receivers embodying the present invention.

Illustrated in FIG. 1 is an apparatus 10 for monitoring a television receiver to record information for the rating of television programs. A conventional television receiver R has a conventional antenna A. The apparatus 10 comprises a radio frequency amplifier 11, which has the input thereof connected to the output of the antenna A. The output of the radio frequency amplifier 11 advances through a suitable well-known power splitter 12 to be split into two separate but alike radio frequency signals. One radio frequency signal is fed to the monitored television receiver R through a band splitter 13 and the other radio frequency signal is fed to a conventional voltage controlled tuner 15 through a band splitter 16. The tuner 15 may be of the type commonly found in conventional television receivers. The radio frequency signal entering the television receiver R is at least the strength of the signal picked up by the antenna A. The tuner 15 may be located adjacent to an IF probe 20.

The suitable IF probe 20 detects the aural and visual intermediate frequency signals of the television receiver R and extracts therefrom, in the exemplary embodiment, 43.5 $MH_z$ intermediate frequency signals. The IF signals include the visual carrier and the aural carrier of the channel to which the monitored television receiver R is tuned. The IF signals, which in the exemplary embodiment are 43.5 $MH_z$, are amplified by IF amplifiers 21 and 22 with an interconnecting automatic gain control circuit 23. The output of the IF amplifier 22, in the exemplary embodiment, are the 43.5 $MH_z$ IF signals. Connected to the output of the IF amplifier 22 is an IF mixer-amplifier 25, which converts the visual and aural intermediate frequency signals into an intercarrier frequency and amplifies the same. In the exemplary embodiment, the intercarrier frequency is in the neighborhood of 4.5 $MH_z$. The intercarrier frequency signal is the difference between the visual carrier frequency and the aural carrier frequency. The IF mixer-amplifier 25, in the exemplary embodiment, is tuned for the intercarrier frequency signal to be optimum about 4.5 $MH_z$. Thus, the output frequency of the IF mixer-amplifier 25, in the exemplary embodiment, is approximately centered about the optimum frequency of 4.5 $MH_z$. The output of the IF mixer-amplifier 25 is applied to one input of a suitable phase comparator, such as the well-known double-balanced mixer phase detector 30. The phase detector 30 can be either a digital detector or an analog detector.

Simultaneously with the above-described operation, signals from the television transmitters are sensed by the antenna A, which, in turn, are amplified by the radio frequency amplifier 11. The power splitter 12 feeds the radio frequency signals to the band splitter 16 for advancement to the voltage controlled tuner 15. The voltage controlled tuner 15 automatically scans the various channels of the broadcast television programs. The sequential scanning of successive channels by the tuner 15 continues until the tuner 15 is tuned to the same channel to which the monitored television receiver R is tuned.

The voltage controlled tuner 15 produces in its output a succession of respective IF signals for the respective channels of the television programs broadcast by television transmitter for detection by the antenna A. The IF frequency signals for each channel taken respectively include an aural IF frequency signal and a visual IF frequency signal. The succession of respective IF signals appearing in the output of the voltage controlled tuner 15 is fed to a suitable IF amplifier 41. A suitable automatic gain control circuit 42 interconnects the amplifier 41 and the tuner 15. In the exemplary embodiment, the output of the IF amplifier 41 are 43.5 $MH_z$ signals, which are fed to an IF mixer-amplifier 45.

The IF mixer-amplifier 45 is tuned to pass a succession of respective intercarrier frequency signals. The IF mixer-amplifier 45 converts the visual intermediate frequency carrier and the aural intermediate frequency carrier for each channel, respectively, into the intercarrier frequency signal and amplifies the same. The intercarrier frequency, in the exemplary embodiment, is in the neighborhood of 4.5 MH$_z$. The respective intercarrier frequency signals are the differences between the visual carrier frequency and the aural carrier frequency of the various channels to which the broadcast signals are sensed by the antenna A. In the exemplary embodiment, the IF mixer-amplifier 45 is tuned for an intercarrier frequency signal to be optimum at 4.5 MH$_z$. Thus, the output frequency of the IF mixer-amplifier 45 is approximately centered about the optimum frequency of 4.5 MH$_z$, in the preferred embodiment. The output of the IF mixer-amplifier 45 is applied to the other input of the double-balanced mixer phase detector 30.

The phase detector 30 compares simultaneously the instantaneous frequencies (i.e., phase) of the applied intercarrier frequency signals. Thus, the detector 30 compares continuously the intercarrier frequency signal of the channel to which the television receiver R is tuned and the succession of intercarrier frequency signals resulting from the tuner 15 scanning in succession the various channels of television programs detected by the antenna A.

The output of the phase detector 30 at a particular instant in time, after filtering out the sum frequency signals, is as folows:

$$V_o = A V_1 V_2 \cos [\theta_1 - \theta_2],$$

where $A$ = gain of detector 30;
$V_1 \, /\theta_1$ = 4.5 MH$_z$ from the television receiver R;
$V_2 \, /\theta_2$ = 4.5 MH$_z$ from the tuner 15.

From the foregoing, it is to be observed that when the intercarrier frequency signals being compared have the same instantaneous frequency, then $(\theta_1 - \theta_2)$ is time invariant. Thus, $V_o$ is a direct current signal proportional to the phase difference between the two intercarrier frequency signals. When the intercarrier frequency signals being compared are changing in phase with respect to one another, then $V_o$ is an alternating current voltage. The frequency of the alternating current voltage is determined by the rate of phase change between the two intercarrier frequency signals.

Therefore, when the tuner 15 and the television receiver R are simultaneously tuned to the same channel, the output of the detector 30 is a direct current voltage. When the tuner 15 and the television receiver R are tuned to different channels during a given time period, the output of the phase detector 30 is a relatively large, alternating current signal. Since the amplitudes of the intercarrier frequency signals are respectively controlled by the automatic gain control circuits 23 and 42, the output signal of the phase detector 30 depends only upon the instantaneous phase differences between the simultaneously compared intercarrier frequency signals and not on any variations in the amplitudes thereof. Additionally, it should be observed that when the IF mixer-amplifier 25 does not produce an output signal, the television receiver R is either not operating or is turned off. When the IF mixer-amplifier 45 does not produce an output signal, then the tuner 15 is not tuned to a channel and is in a searching mode.

Connected to the output of the phase detector 30 is a suitable amplifier 30', which blocks out D.C. voltages from the phase detector 30 and amplifies the A.C. voltage output of the phase detector 30. The amplified A.C. voltages from the phase detector 30 are converted into D.C. voltage signals by a converter circuit 44' including a diode 44, capacitor 45' and resistor 46. Similarly, the amplified A.C. voltages from the IF mixer-amplifier 25 are converted into D.C. voltage signals by a converter circuit 48' including a diode 48, capacitor 49 and resistor 50. Likewise, the amplified A.C. voltages from the IF mixer-amplifier 45 are converted into D.C. voltage signals by a converter circuit 56' including a diode 56, a capacitor 57 and a resistor 58.

The converter circuits 44', 48' and 56' are connected, respectively, to suitable threshold detector buffer amplifiers 43, 47 and 55. It is the D.C. voltage signals from the converter circuits 44', 48' and 56' that drive respectively the threshold detector buffer amplifiers 43, 47 and 55. A logic circuit 59 is operated by the D.C. voltage signals from the amplifiers 44, 47 and 55.

The logic circuit 59 includes an AND gate 62, which has one input connected to the output of the amplifier 47 and another input connected to the output of the amplifier 55. The output of the amplifier 47 is also connected to one input of an exclusive OR gate 65 over a conductor 47'. In turn, the output of the exclusive OR gate 65 is connected to a tone matrix 66 to be described in greater detail hereinafter.

As previously described, when there is no output in the IF mixer-amplifier 25, then the television receiver R is not operating or is turned off. Therefore, there will not be a D.C. voltage output from the amplifier 47 under this condition. As a consequence thereof, the zero potential on the conductor 47' causes the exclusive OR gate 65 to operate the tone generating matrix 66 to produce a combination of tones or audio frequency signals representative of the off state of the television receiver R. This condition gets priority in the operation of the logic circuit 59. Additionally, the exclusive OR gate 65 inhibits the tone generating matrix 66 from producing tone signals or audio frequency signals, which identify a television channel.

When the television receiver R is on and is tuned to a channel, an output signal is produced by the IF mixer-amplifier 25 and a D.C. voltage signal is produced in the output of the amplifier 47. When the voltage controlled tuner 15 is tuned to a channel, an output signal is produced in the IF mixer-amplifier 45 and a D.C. voltage signal is produced in the output of the amplifier 55. The simultaneous application of D.C. voltage signals from the amplifiers 47 and 55 to the input side of the AND gate 62 causes the AND gate 62 to produce a high potential on the output side thereof. Connected to the AND gate 62 is one input of an AND gate 61. A high potential on the input of the AND gate 61 from the AND gate 62 enables the AND gate 61. The other input of the AND gate 61 is connected to the amplifier 43 through an inverter 60.

At this time, the logic circuit 59 seeks to detect phase coherency from the phase detector 30. When the instantaneous intercarrier frequency signals applied simultaneously to the phase detector 30 are incoherent, there is a D.C. voltage output in a high state from the amplifier 43. When the instantaneous intercarrier frequency signals applied simultaneously to the phase detector 30 are coherent, then the output of the amplifier 43 is in a low state. When the output voltage from the amplifier 43 is in a high state, the output of the AND gate 61 is at a low D.C. voltage. Thereupon, a signal is transmitted over a conductor 70' to activate a suitable stepping oscillator 70 for operating the voltage controlled tuner 15 in its scanning operation for being tuned to the succeeding channel in a manner to be described in detail hereinafter. Additionally, a signal is transmitted over a conductor 72 to be applied to an AND gate 71, which causes the exclusive OR gate 65 to operate the tone generating matrix 66 for producing combination tones or audio frequency signals representative of a searching mode or a scanning mode for the tuner 15. At this time, the exclusive OR gate 65 inhibits the tone generating matrix 66 from producing tone signals or audio frequency signals which identify a television channel.

When the D.C. voltage output from the amplifier 43 is at a low state, the output of the AND gate 61 is at a high state. Connected to the output of the AND gate 61 is a suitable time delay circuit 75, which, in the preferred embodiment, is a 10-second time delay. Should the output of the detector 30 remain phase coherent over the 10-second period, then the output of the AND gate 61 will remain high for a 10-second period. As a consequence thereof, the state of the exclusive OR gate 65 enables the tone generating matrix 66 to produce combination tones or audio frequency signals representative of the channel to which the tuner 15 is tuned. The channel identification tones are continuously generated until the television receiver R is tuned to another channel or turned off by an operator.

Thus, the tone generating matrix 66 produces combination tones or audio frequency signals to identify the on/off status of the television receiver R, combination tones or audio frequency signals to identify the state of the tuner 15 being in a search mode, and combination tones or audio frequency signals for each channel which is selected to identify the particular channel to which the tuner 15 is tuned, when the tuner 15 and the television receiver R are simultaneously tuned to the same channel. The tones or audio frequency signals generated by the tone generating matrix 60 frequency modulate a carrier through a conventional modulator 67 for transmission to a data receiver 100 over household power lines 90 and 91. A predetermined carrier frequency is assigned to each monitoring apparatus 10 for modulation by the tones produced from the tone generating matrix 66. In the exemplary embodiment, the carrier frequencies are in the range between 150 KH$_z$ and 350 KH$_z$.

Each time the stepping oscillator 70 is activated by the output of the AND gate 61, a pulse from the stepping oscillator 70 sequentially advances a 5-stage binary counter 80 to its succeeding higher state. In the exemplary embodiment, there are 31 possible output conditions. The output of the counter 80 is decoded by a decoder 81 and turns on sequentially during each change of state one of 29 solid state switches, such as transistors 82(1) – 82(29). Connected in series with the transistors 82(1) –. 82(29) are potentiometers 83(1) – 83(29), which are progressively different resistances. Connected to the potentiometers 83(1) – 83(29) is a suitable amplifier 85, which, in turn, is connected to the voltage controlled tuner 15. When one of the transistors 82(1) – 83(29) is turned on, current flows through its associated potentiometer 83(1) – 83(29) to apply a predetermined voltage to the voltage controlled tuner 15. By progressively varying the voltage applied to the tuner 15, the tuner 15 is stepped sequentially through the 29 channels. Two additional states of the counter 80 are used to indicate the OFF condition and the scanning condition. Once the tuner 15 has been tuned to an operating channel, an automatic fine tuning circuit 86 comprising resistors 87 and 88 is employed to assure fine tuning. Thus, the voltage controlled tuner 15 is tuned successively, in the preferred embodiment, through 29 preselected channels.

Connected to the output of the decoder 81 at the input side of the transistor switches 82(1) – 82(29), respectively, are cconductors 89(1) – 89(29), which are also connected to the tone generating matrix 66. As the decoder 81 advances its state and while the switches 82(1) – 82(29) are turned on, respectively, the tone generating matrix 66 will produce, when not inhibited by the output of the exclusive OR gate 65, combination tone or audio frequency signals indicating which transistor switch 82(1) – 82(29) is turned on. Stated otherwise, the tones or audio frequency signals so produced will indicate the channel to which the voltage controlled tuner 15 is tuned and also the OFF state and searching mode. The tone signals indicating the channel to which the tuner 15 is tuned, the OFF state and searching mode frequency modulate a carrier frequency signal through the modulator 67 for transmission over the power lines 90 and 91 to the data receiver 100.

The channel identification signal for the tuner 15, the search mode signal for the tuner 15, and the on/off signal of the monitored television receiver R are transmitted from the modulator 67 over the power lines 90 and 91 to the data receiver 100. The modulator 67 has a prescribed carrier frequency between 150 KH$_z$ – 350 KHz. Each apparatus 10 will have a different predetermined carrier frequency. The carrier frequency generated by the modulator 67 is frequency modulated by data tones generated by the tone generating matrix 66. The data tones identify respectively the channels to which the tuner 15 is tuned when there is phase coherency over a prescribed period of time, the on/off status of the television receiver R, and the search mode of the tuner 15. The output of the AND gate 47 through an inverter 93 serves to reset the counter 80 to zero, when the television receiver R is in the off state.

Figure 2:
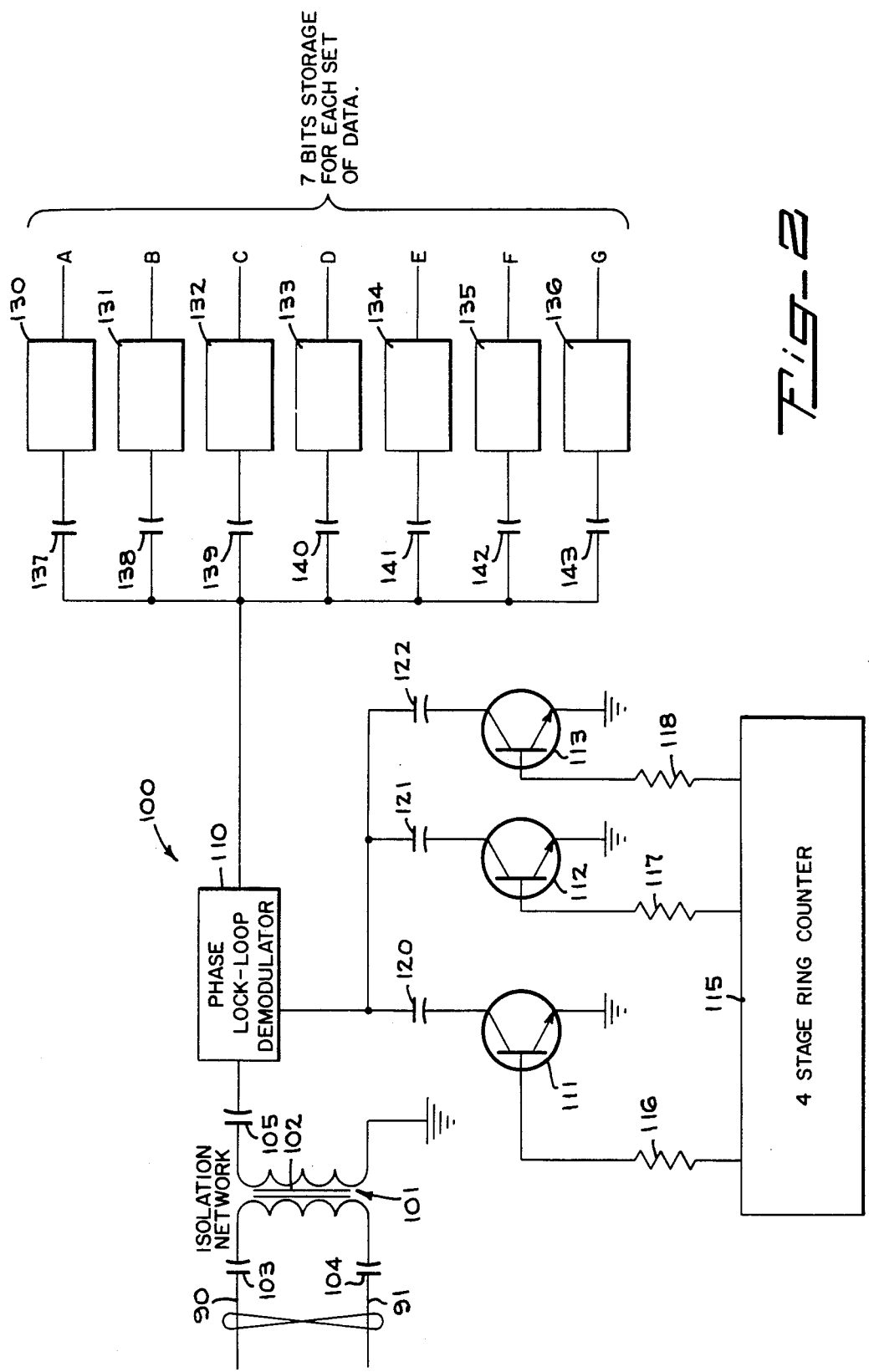
FIG. 2 is a schematic diagram of a data receiver employed in connection with the apparatus shown in FIG. 1.

Illustrated in FIG. 2 is the data receiver 100, which is located in the household having the television receiver mounted in a remote location. The data receiver 100 comprises an isolation network 101 for presenting a low impedance to the incoming carrier frequency signal to provide line isolation and to remove noise picked up on the household wiring. The isolation network 101 comprises a transformer 102 and capacitors 103–105.

The incoming carrier frequency signal is demodulated by a conventional FM phase-lock-loop demodulator 110. Additionally, the demodulator 110 amplifies the tone modulating signals detected by the demodulator 110.

In the event more than one incoming carrier frequency signal is conducted over the power lines 90 and 91, the carrier frequency signal to be detected by the demodulator 110 is selected. Toward this end, the locking frequency of the demodulator is selected by selectively operating transistor switches 111–113. Connected in series with the transistor switches 111–113, respectively, are the ends of one side of capacitors 120–122 of different predetermined capacitances. The ends of the other side of the capacitors 120-122 are connected to the demodulator 110 over a common conductor. When one of the transistor switches 111-113 is turned on, the capacitor of the capacitors 120-122 in series therewith is active to select the locking frequency of the FM demodulator 110. Thus, the FM demodulator 110 is selectively operated to detect the incoming carrier frequency of the modulator 67, whereby the tone modulating signals are recovered from the control voltage of the voltage controlled oscillator in the demodulator 110. A four-stage ring counter 115 is connected to the transistor switches 111-113 through respective resistors 116-118. The four-stage ring counter 115 is operated in a well-known manner by pulses to selectively turn on the transistor switches 111-113.

The demodulated tones or audio frequency signals from the output of the FM demodulator 110 selectively drives conventional phase-lock-loop circuits 130-136, such as NE 567 integrated circuits, for decoding the demodulated audio frequency signals to represent data. The data is stored in a well-known manner in 8 bit binary storage devices. Thus, digital data is recorded by the data receiver 100. The ends of one side of the capacitors 137-143 are connected respectively to the phase-lock-loop circuits 130-136 and the ends of the other side of the capacitors 137-143 are connected over a common conductor to the output of the FM demodulator 110.

Figure 3:
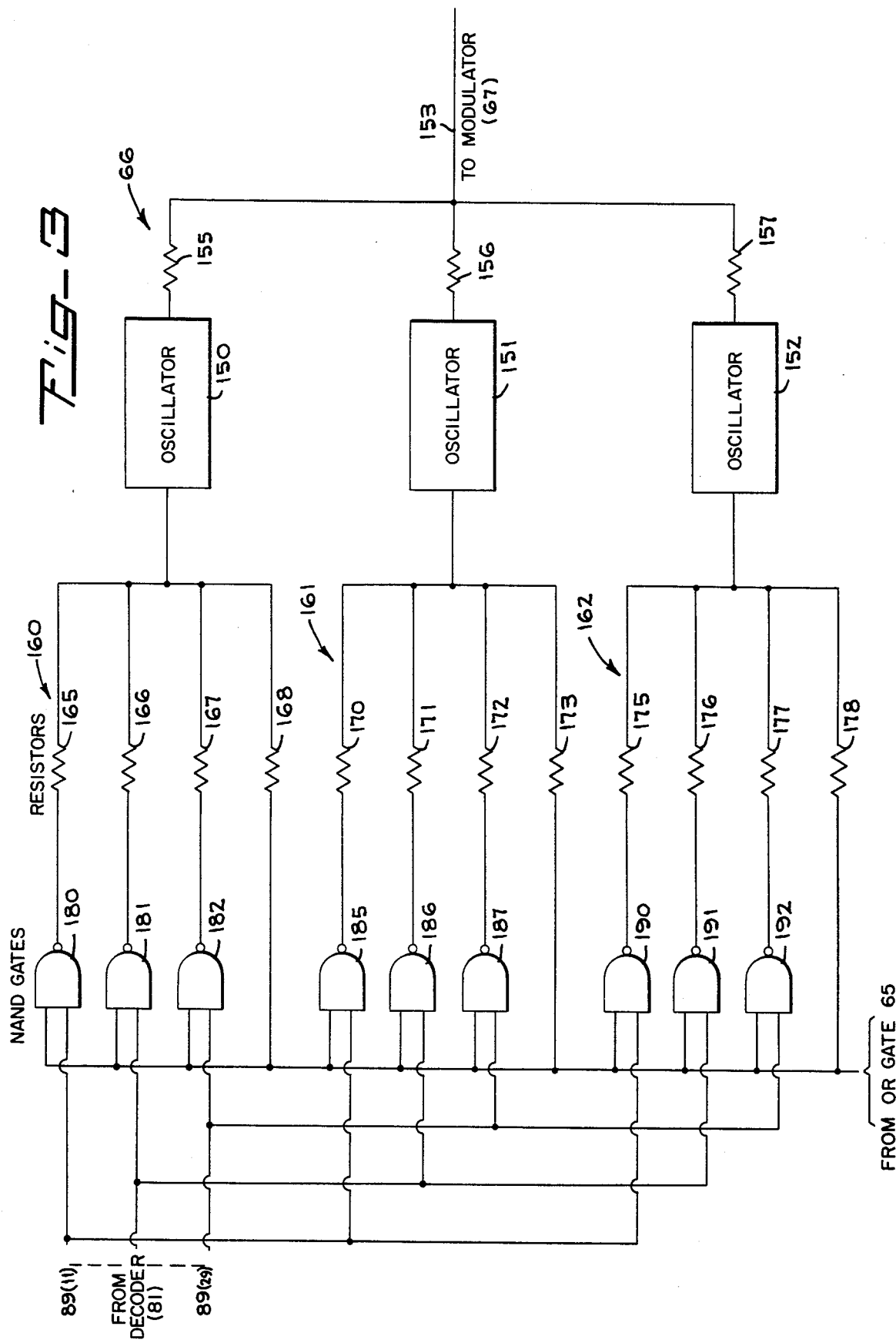
FIG. 3 is a schematic diagram of a tone generating matrix employed in the apparatus shown in FIG. 1.

Illustrated in FIG. 3 is an exemplary embodiment of the tone generating matrix 66, which comprises suitable audio frequency oscillators 150-152, such as NE 566 transistor oscillating circuits. The audio frequency oscillators 150-152 operate to generate three tones or audio frequency signals of different combinations (FIG. 4), which are transmitted over a conductor 153 and through resistors 155-157, respectively, to the modulator 67 for modulating the carrier frequency, whereby channel identification signals, an on/off signal, and a search mode signal are transmitted.

In series with the oscillators 150-152, respectively, are three networks of resistors 160-162. The effective resistance of the networks of resistors 160-162 selects the oscillating frequencies of the oscillators 150-152, respectively. In the network 160 are resistors 165-168 of various resistance values. Likewise, in the network 161 are resistors 170-173 of various resistance values. Similarly, in the network 162 are resistors 175 of various resistance values. Thus, by selecting the resistors 165-168 for conduction, the oscillating frequency of the oscillator 150 is selected. In the same manner, by selecting the resistors 170-173 for conduction, the oscillating frequency of the oscillator 151 is selected. Similarly, by selecting the resistors 175-178 for conduction, the oscillating frequency of the oscillator 152 is selected.

For selecting the resistors 165-168 for conduction, NAND gates are connected in series with the resistors 165-167, respectively. To select the resistors 170-173 for conduction, NAND gates are connected in series with the resistors 170-173, respectively. Connected in series with the resistors 175-178, respectively, are NAND gates 190-192. The operation of the NAND gates 180-182, 185-187, and 190-192 are selectively controlled by the output of the decoder 81. As previously described, each time the stepping oscillator 70 is activated by the output of the AND gate 61, a pulse from the stepping oscillator 70 sequences advances the 5-stage binary counter 80 to its succeeding higher state. The output of the counter 80 is decoded by the decoder 81. Hence, the output of the decoder selectively turns on and off the NAND gates 180-182, 185-187, and 190-192 for the selective conduction of the resistors 165-167, 170-172, and 175-177. This action, in turn, causes the oscillators 150-152 to generate tone signals for identifying the channel to which the turner 15 is tuned (FIG. 4). Each channel is identified by a combination of different tone signals.

When the monitored television receiver R is off or is not tuned to a channel, the output of the OR gate 65 is applied to the networks 160-163 for the oscillators 150-152 to generate tone signals for identifying the off state of the monitored television receiver R (FIG. 4) and to inhibit the generation of channel identification tones. When the tuner 15 is in a search mode, the output of the OR gate 65 is applied to the networks 160-163 for the oscillators 150-152 to generate tone signals identifying that the tuner 15 is in a search mode and to inhibit the generation of channel identification tones.

We claim:
1. Apparatus for monitoring a television receiver comprising:
  a. first means responsive to aural and visual intermediate frequency signals from a television receiver being tuned to a broadcasting channel for producing a first intercarrier signal;
  b. second means tunable to a broadcasting channel and responsive to aural and visual intermediate frequency signals from a television broadcasting signal source for producing a second intercarrier signal in response to being tuned to a broadcasting channel;
  c. third means connected to said second means for causing said second means to be tuned sequentially to a plurality of television broadcast channels; and
  d. fourth means includng a phase detector comparator circuit responsive to said first intercarrier signal and said second intercarrier signal, said fourth means applying a first output voltage to said third means in response to said first and second intercarrier signal being incoherent for causing said second means to be tuned to another broadcasting channel, said fourth means producing a second output voltage in response to said first and second intercarrier signals being coherent to represent said first and second means being tuned to the same broadcasting channel.

2. An apparatus as claimed n claim 1 wherein said fourth means is responsive to said first and second intercarrier signal being similar simultaneously over a predetermined period of time to produce said second output voltage.

3. Apparatus as claimed in claim 1 and comprising a data receiver connected to said fourth means for recording data in response to said fourth means producing either said first or said second output voltage.

4. Apparatus as claimed in claim 1 wherein said first means detects the aural and visual intermediate frequency signals and converts them to said first intercarrier signal and wherein said second means converts said television broadcast signals to the aural and visual intermediate frequency signals and converts said aural and visual intermediate frequency signals to said second intercarrier signal.

5. Apparatus as claimed in claim 1 wherein said comparator circuit compares simultaneously the instantaneous first intercarrier signal and the instantaneous second intercarrier signal.

6. Apparatus as claimed in claim 5 wherein said fourth means is responsive to the instantaneous first intercarrier signal and the instantaneous second signal carrier being similar over a predetermined period of time to produce said second output voltage.

7. Apparatus as claimed in claim 1 and comprising tone signal generating means for producing various audio signals to identify various channels in response to said third means causing said second means to be tuned sequentially to a plurality of broadcast channels.

8. Apparatus as claimed in claim 7 wherein said tone signal generating means produces various audio signals in response to said fourth means producing said first or said second output voltage.

9. Apparatus as claimed in claim 1 wherein said phase detector produces a direct current voltage as said second output voltage in response to said first and second intercarrier signal being coherent.

10. Apparatus as claimed in claim 9 wherein said phase detector produces an alternating current voltage as said first output voltage in response to said first and second intercarrier frequency being incoherent.

11. Apparatus as claimed in claim 4 wherein said second means includes a voltage tuned tuner.

12. Apparatus as claimed in claim 11 wherein said third means causes the voltage applied to said tuner to be varied for tuning said tuner sequentially to the plurality of channels.

13. Apparatus as claimed in claim 12 wherein said first means inclues an intermediate frequency probe.

14. Apparatus as claimed in claim 13 wherein said probe and said tuner are located adjacent one another.

15. Apparatus for monitoring a television receiver comprising:
   a. first means responsive to intermediate frequency signals from a television receiver being tuned to a broadcasting channel for producing a first intercarrier signal;
   b. second means tunable to a broadcasting channel and responsive to intermediate frequency signals from a television broadcasting signal source for producing a second intercarrier signal in response to being tuned to a broadcasting channel;
   c. third means connected to said second means for causing said second means to be tuned sequentially to a plurality of television broadcast channels;
   d. fourth means including a phase detector comparator circuit responsive to said first intercarrier signal and said second intercarrier signal, said fourth means applying a first output voltage to said third means in response to said first and second intercarrier signal being incoherent for causing said second means to be tuned to another broadcasting channel, said fourth means producing a second output voltage in response to said first and second intercarrier frequencies being coherent to represent said first and second means being tuned to the same broadcasting channel;
   e. a data receiver connected to said fourth means for recording data in response to said fourth means producing either said first or said second output voltage; and
   f. a power line interconnecting said data receiver to said fourth means.

16. Apparatus as claimed in claim 15 and comprising tone signal generating means for producing various audio signals in response to said fourth means producing said first or said second output voltage for transmission over said power line to said data receiver.

17. Apparatus as claimed in claim 16 and comprising a modulator responsive to the output of said tone signal generating means for transmitting over said power line tone modulated signals.

18. Apparatus as claimed in claim 17 wherein said data receiver records digital data.

19. Apparatus as claimed in claim 16 wherein said tone generating means produces various audio signals for transmission over said power line to said data receiver in response to said third means causing said second means to be tuned sequentially to a plurality of broadcast channels.

20. Apparatus as claimed in claim 19 and comprising a modulator responsive to the output of said tone signal generating means for transmitting over said power line tone modulated signals.

* * * * *